Patented Jan. 9, 1951

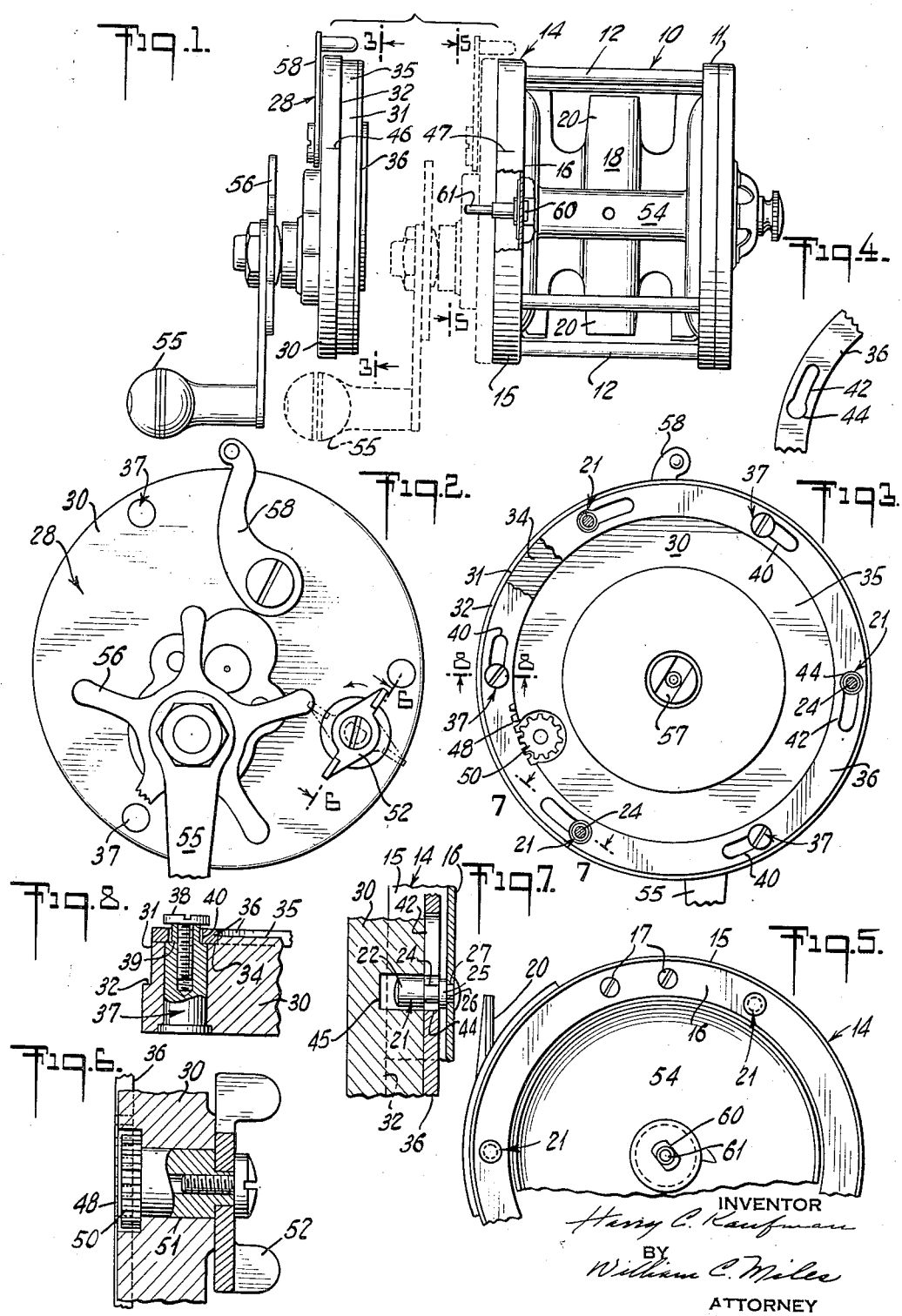

2,537,590

UNITED STATES PATENT OFFICE 2,537,590

FISHING REEL

Harry C. Kaufman, Strasburg, Pa.

Application May 14, 1948, Serial No. 27,000

6 Claims. (Cl. 242—84.1)

This invention relates to fishing reels and is herein illustrated in connection with a reel of the type comprising a frame, which includes a pair of end plates, supporting therebetween a rotatable line-carrying spool, the operation and control of which may be effected through the medium of suitable means carried by one of the end plates.

An important object of the present invention is to provide a generally improved fishing reel, which is so constructed as to enable certain of its essential units to be readily assembled and disassembled as occasions may require.

To the above and other ends the invention contemplates a reel wherein the frame is provided with a plurality of headed locking studs, extending outwardly therefrom in a parallel relation to the axis of the spool and adapted to enter a series of stud-receiving sockets formed in one of the end plates, on the inner face of which is rotatably mounted a locking ring, having a series of key-hole slots provided therein and adapted at their larger ends to permit the headed ends of the respective studs to enter said sockets so that the locking ring at points adjacent the narrow portion of said slots may so function as to establish a stable connection between the frame and socket-bearing end plate incident to rotation of the locking ring as effected by an intermeshing rack and pinion, the former of which constitutes a portion of the locking-ring and the latter of which is carried by a rotatable shaft journaled in the end plate and provided at its outer end with a double-wing operating lever conveniently arranged to facilitate movement of the locking ring in either direction, depending upon whether the end plate is to be attached to or detached from the stud-bearing frame.

Other objects and advantages of the invention will become apparent from the following description when taken in connection with the accompanying drawings, wherein Fig. 1 is an exploded view of a reel embodying the present invention, certain portions of which are shown in section and the removable end plate being illustrated in full lines as detached from the reel frame and in dotted lines as occupying its operative position thereon, Fig. 2 is a full scale face view of the end plate of Figure 1 as viewed from the left therein, Fig. 3 is a full scale elevation of the end plate as viewed in the direction of the arrows 3—3 in Figure 1, the locking studs being illustrated within the enlarged ends of the key-hole slots with their neck portions shown in section and positioned to enter the narrow portions of the slots incident to movement of the locking ring in a counterclockwise direction, Fig. 4 is a fragmental view of the locking ring and illustrating the configuration of one of the several key-hole slots provided therein, Fig. 5 is a full scale fragmental elevation of the reel frame as viewed in the direction of the arrows 5—5 in Figure 1, Fig. 6 is an enlarged fragmental sectional view taken on line 6—6 of Figure 2, Fig. 7 is an enlarged fragmental sectional view taken on line 7—7 of Figure 3 and showing the shank portion of one of the locking lugs as positioned to enter the narrow portion of one of the key-hole slots of the locking ring, and Fig. 8 is an enlarged fragmental sectional view taken on line 8—8 of Figure 3.

Although the present invention may be employed in connection with various types of reels, the one herein illustrated as embodying the invention is designed especially for use in salt water fishing and is equipped with the usual operating and control means carried by one of the end plates and hereinafter more particularly mentioned.

The reel includes a frame 10, comprising a fixed end plate 11, connected, as by a plurality of tie-rods 12, to an end-plate receiving ring 14. The receiving ring 14 is formed with a peripheral flange 15, carrying at right angles thereto an inwardly extending anchor flange 16 disposed in a parallel relation to the end plate 11 and adapted for the reception of suitable screws, as shown at 17 in Figure 5, by which the receiving ring may be rigidly connected, as a unit, to the several tie-rods 12. As is customary, the reel frame 10 carries rigidly thereon a suitable reel seat unit 18, which includes a pair of retaining arms 20, by which the reel may be detachably connected to any standard type of fishing rod in accordance with usual practice.

At equi-distantly spaced points on the receiving ring 14 are carried a plurality of locking studs 21, there being three of such studs included in the present embodiment of the invention as will be best understood from an inspection of Figure 3.

Referring to Figure 7, wherein one of the studs 21 is shown on an enlarged scale, it will be understood that each stud includes a head 22, a reduced neck-portion 24, an abutment shoulder 25 and a shank portion 26. The studs 21 may be conveniently secured to the receiving ring 14 by passing the shank-portions 26 thereof through suitable openings 27 formed in the anchor flange 16, and then upsetting the shank portions into firm engagement with the anchor flange.

As will later more clearly appear, the studs 21 are adapted to function as highly important elements in attaching to the frame 10 a demountable head 28, which includes an end plate 30, having a diametrically reduced portion 31 adapted to enter and snugly fit within the receiving ring 14, the larger diametrical portion of the plate presenting an annular shoulder 32 adapted to abut the peripheral flange 15 of the receiving ring when the driving head is positioned as indicated in dotted lines in Figure 1. The inner face of the end plate 30 is relieved along its peripheral margin so as to provide a relatively shallow annular ledge 34, the inner limit of which is determined by reason of the presence of a slightly protruding boss 35 serving as bearing on which is mounted a locking ring 36.

The locking ring 36 is seated on the ledge 34 and is held against removal therefrom by a plurality of anchor studs 37 in respective association with a corresponding number of headed locking-ring retaining screws 38. The several anchor studs 37, herein shown as three in number, are carried by the end plate 30 and are so dimensioned that their respective neck portions 39 are adapted to fit with reasonable accuracy and extend slightly through a series of arcuate slots 40 formed in the locking ring 36. It will be understood, especially from an inspection of Figure 8, that when the screws 38 are so run down in the anchor studs 37 that the screw heads engage the neck portions of such studs, the locking ring 36 will be effectively held against removal from the ledge 34 but yet permitted to rotate in either direction to the arcuate extent of the respective slots 40.

As will be understood from an inspection of Figure 3, the locking ring 36 is provided with a series of arcuate key-hole slots 42, located at points intermediate the above mentioned slots 40 and spaced from each other a distance corresponding to the spacing of the locking studs 21 so that the larger ends 44 of the key-hole slots may, when the locking ring is properly positioned, permit the heads 22 of the locking studs to enter a series of stud-receiving sockets 45 formed in the end plate 30, as shown most clearly in Figure 7, and spaced from each other a distance also corresponding to the spacing of the locking studs.

Since the spaces afforded, respectively, between the locking studs 21, the larger ends 44 of the key-hole slots 42, and the stud-receiving sockets 45 are identical, it follows that when the locking ring 36 is so positioned, as shown in Figure 3, that the larger ends of the key-hole slots register with the stud-receiving socket, the heads 22 of the locking studs may pass freely through the locking ring and into the respective lug-receiving sockets as the driving head 28 is placed on the reel frame 10 in its dotted line position indicated in Figure 1. However, in order to facilitate proper registration as between the locking studs 21 and the stud-receiving sockets 45, indexing lines 46 and 47 are provided on the respective peripheries of the receiving ring 14 and the driving head 28, the indexing lines being individually so located that when they are brought into alignment the stud-receiving sockets will assume registering positions with relation to the locking studs, thus allowing the driving head to be readily introduced into the assembly and assume its functioning position, as indicated in dotted lines in Figure 1.

It is to be noted that incident to introducing the driving head 28 into the assembly as above described, the neck portions 24 of the locking studs 21 are positioned to enter the narrow portions of the respective key-hole slots 42 upon rotation of the locking ring in a counter clockwise direction, reference being had to Figure 3. Here it may be well to point out that since the locking studs 21, which are carried by the reel frame 10, snugly fit the stud-receiving sockets 45, which are formed in the driving head 28, relative rotation as between the reel frame and driving head is effectively prevented, with the result that such rotation of the locking ring 36 as may be necessary to lock the driving head to the reel frame, or unlock it therefrom, may be effected without disrupting their positions of registration.

In order that the locking ring 36 may be rotated in a counter clock-wise direction, reference being had to Figure 3, so that the neck-portions 24 of the locking studs 21 will move, relatively speaking, into the narrow portions of the key-hole slots 42 and thereby detachably anchor the driving head 28 to the reel frame 10, there is provided an intermeshing rack 48 and pinion 50, the former of which constitutes a portion of the locking ring and the latter of which is carried on the inner end of a rotatable shaft 51 journaled in the end plate 30 and provided at its outer end with a double-wing operating lever 52, conveniently arranged to facilitate movement of the locking ring.

Referring especially to Figures 2 and 3, it will be understood that rotation of the operating lever 52 in a clock-wise direction, as viewed in Figure 2, will effect rotation of the locking ring 36 in the proper direction to anchor the driving head 28 to the reel frame 10, whereas rotation of the operating lever in an opposite direction will so displace the locking ring as to sever anchorage between the driving head and the reel frame, thus enabling one to be completely detached or separated from the other.

As will be understood from an inspection of Figure 1, the usual line-carrying spool 54 is supported by the end plate 11 and the driving head 28, the latter of which is equipped with suitable spool-operating gearing, not shown, by which the spool may be rotated in a counter clockwise-direction, reference being had to Figure 2, as the operating handle 55 is turned in a clock-wise direction.

Reels of the type herein shown as embodying the present invention are customarily provided with braking means, by which resistance to the turning of the spool may be varied, as when a fish is running with the line. The reel herein illustrated readily adapts itself to the so-called "star drag" type of braking means, not shown except for its included star wheel 56, carried by the driving head 28 and conveniently located for operation independently of the adjacent spool-operating handle 55.

Usually reels of the type herein shown as embodying the present invention are provided with a well known type of control means by which the spool may be connected to and disconnected from the spool-operating gearing. The present reel readily adapts itself to such control means, not shown except for its included clutch element 57 and clutch actuating lever 58, the former being mounted in the driving head 28 for rotation under the influence of the spool operating gearing, not shown, and the latter being pivotally supported on the driving head and adapted, in accordance with usual practice, to move the clutch element into and out of driving engagement with the usual clutch-element-receiving shoulder 60 of the reel spindle 61, one end of which is suitably journaled in the driving head and the other end of which, not shown, is suitably journaled in the end plate 11.

What is claimed is:

1. A fishing reel comprising a frame including a receiving ring, an end plate, and operable means for detachably connecting said plate to said receiving ring and including a plurality of locking studs carried by said receiving ring, a rotatable locking ring carried by said plate and including locking portions adapted to engage and disengage said studs as said locking ring is rotated first in one direction and then in an opposite direction, and rack-and-pinion means in association with said locking ring for effecting rotation thereof in one direction or the other depending upon whether said plate is to be connected to or disconnected from said frame.

2. A fishing reel comprising a frame including a receiving ring, an end plate, and operable means for detachably connecting said plate to said receiving ring and including a plurality of locking studs carried by said receiving ring, a rotatable locking ring carried by said plate and including locking portions adapted to engage and disengage said studs as said locking ring is rotated first in one direction and then in an opposite direction, a rack constituting a portion of said locking ring, a pinion meshing with said rack, and a shaft connected to said pinion, said shaft being journaled in said plate and accessible for manual rotation in either direction, whereby said locking ring may be rotated in one direction or the other depending upon whether said plate is to be connected to or disconnected from said frame.

3. A fishing reel comprising a frame including a receiving ring, an end plate, and operable means for detachably connecting said plate to said receiving ring and including a plurality of locking studs carried by said receiving ring, a rotatable locking ring carried by said plate and including locking portions adapted to engage and disengage said studs as said locking ring is rotated first in one direction and then in an opposite direction, rack-and-pinion means in association with said locking ring for effecting rotation thereof in one direction or the other depending upon whether said plate is to be connected to or disconnected from said frame, and restraining means rendered effective incident to applying said plate to said receiving ring to hold said plate and said frame against relative rotation during such time as said locking ring is being rotated in either direction and during such time as said plate may remain connected to said frame.

4. A fishing reel comprising a frame including a receiving ring, an end plate having a series of stud-receiving sockets provided therein, and operable means for detachably connecting said plate to said receiving ring and including a plurality of locking studs carried by said receiving ring and adapted to enter said sockets incident to applying said plate to said receiving ring, whereby said plate and said frame are held against relative rotation, a rotatable locking ring carried by said plate and including locking portions adapted to engage and disengage said studs as said locking ring is rotated first in one direction and then in an opposite direction, and rack-and-pinion means in association with said locking ring for effecting rotation thereof in one direction or the other depending upon whether said plate is to be connected to or disconnected from said frame.

5. A fishing reel comprising a frame including a receiving ring, an end plate, and operable means for detachably connecting said plate to said receiving ring and including a plurality of locking studs carried by said receiving ring, each of said studs being provided with a head and a neck portion, a rotatable locking ring carried by said plate and having formed therein a plurality of key-hole slots, the larger ends of which are adapted to permit passage of said heads therethrough when said plate is being applied to or removed from said receiving ring and the narrow portions of which are adapted to receive said neck portions as said locking ring is rotated in one direction and to release said neck portions as said locking ring is rotated in an opposite direction, and rack-and-pinion means in association with said locking ring for effecting rotation thereof in one direction or the other depending upon whether said plate is to be connected to or disconnected from said frame.

6. A fishing reel comprising a frame including a receiving ring, an end plate, and operable means for detachably connecting said plate to said receiving ring and including a plurality of locking studs carried by said receiving ring, each of said studs, being provided with a head and a neck portion, a rotatable locking ring carried by said plate and having formed therein a plurality of arcuate slots and a plurality of key-hole slots, the larger ends of the latter of which are adapted to permit passage of said heads therethrough when said plate is being applied to or removed from said receiving ring and the narrow portions of which are adapted to receive said neck portions as said locking ring is rotated in one direction and to release said neck portions as said locking ring is rotated in an opposite direction, rack-and-pinion means in association with said locking ring for effecting rotation thereof in one direction or the other depending upon whether said plate is to be connected to or disconnected from said frame, and locking ring retaining means carried by said plate and including a plurality of anchor studs having neck-portions respectively accommodated within said arcuate slots and equipped at their outer ends with retaining screws having heads overlying said locking ring at points adjacent said arcuate slots.

HARRY C. KAUFMAN.

No references cited.